United States Patent
Larkin et al.

(10) Patent No.: US 7,159,031 B1
(45) Date of Patent: Jan. 2, 2007

(54) REMOTE CUSTOMER MANAGEMENT OF VIRTUAL ROUTERS ALLOCATED TO THE CUSTOMER

(75) Inventors: Daithi Larkin, Redwood City, CA (US); Nara Rajagopalan, San Jose, CA (US)

(73) Assignee: Fortinet, Inc., Sunnyvale, CA (US)

( * ) Notice: Subject to any disclaimer, the term of this patent is extended or adjusted under 35 U.S.C. 154(b) by 360 days.

(21) Appl. No.: 09/771,346

(22) Filed: Jan. 26, 2001

(51) Int. Cl.
*G06F 15/173* (2006.01)

(52) U.S. Cl. .................. 709/238; 370/355; 370/400; 726/15

(58) Field of Classification Search ........ 709/223–224, 709/226, 242, 238; 379/15.03, 201.12; 370/400, 370/355; 726/15
See application file for complete search history.

(56) References Cited

U.S. PATENT DOCUMENTS

| | | | | |
|---|---|---|---|---|
| 5,825,772 A | * | 10/1998 | Dobbins et al. | 370/396 |
| 6,069,895 A | * | 5/2000 | Ayandeh | 370/399 |
| 6,173,399 B1 | * | 1/2001 | Gilbrech | 713/153 |
| 6,286,038 B1 | * | 9/2001 | Reichmeyer et al. | 709/220 |
| 6,434,619 B1 | * | 8/2002 | Lim et al. | 709/229 |
| 2001/0043571 A1 | * | 11/2001 | Jang et al. | 370/260 |
| 2001/0052013 A1 | * | 12/2001 | Munguia et al. | 709/225 |
| 2002/0152373 A1 | * | 10/2002 | Sun et al. | 713/150 |
| 2003/0033401 A1 | * | 2/2003 | Poisson et al. | 709/224 |

OTHER PUBLICATIONS

Chan, M.C. et al., "Customer Network Management and Control of Broadband VPN Services," Proc. Fifth IFIP/IEEE International Symposium on Integrated Network Management, May 1997, pp. 301-314.*
Chan, M.C. et al., "An Architecture for Broadband Virtual Networks Under Customer Control," IEEE NOMS, Apr. 1996, pp. 135-144.*
Kim, E.C. et al., "The Multi-Layer VPN Management Architecture," Proc. Sixth IFIP/IEEE International Symposium on Integrated Network Management, May 1999, pp. 187-200.*

* cited by examiner

*Primary Examiner*—Frantz B. Jean
(74) *Attorney, Agent, or Firm*—Hamilton & DeSanctis

(57) ABSTRACT

A computerized system for providing subscriber control of network parameters includes a service processing switch having a plurality of network resources; a service provider management server communicably coupled to the service processing switch and operable to configure the plurality of network resources. The configuration includes an allocation of a subset of the network resources to a subscribing enterprise. A subscriber management server is communicably coupled to the service provider management system and is operable to further configure the subset of the network resources. The system also includes a subscriber management client communicably coupled to the subscriber management server. The client is operable to issue configuration requests to the subscriber management server.

17 Claims, 4 Drawing Sheets

REMOTE CUSTOMER MANAGEMENT OF VIRTUAL ROUTERS ALLOCATED TO THE CUSTOMER

FIELD

The present invention relates generally to computer network routers, and more particularly to systems and methods of customer management of routers provided by third parties.

RELATED FILES

"SYSTEM AND METHOD FOR MANAGING AND PROVISIONING VIRTUAL ROUTERS", Ser. No. 09/663,485,

"SYSTEM AND METHOD FOR MANAGING ROUTER METADATA", Ser. No. 09/663,484, and to two provisional applications each titled "SYSTEMS AND METHOD FOR DELIVERING INTERNETWORKING SERVICES" Ser. Nos. 60/232,577 and 60/232,516, all of which are hereby incorporated herein by reference for all purposes.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2001, CoSine Communications, Inc. All Rights Reserved.

BACKGROUND

The use of networks, including the Internet continues to grow at ever increasing rates. As a result, there is increasing demand for network resources, including those provided by service providers such as Internet Service Providers (ISPs). ISPs typically provide the hardware and software that allow their subscribers to access the network. Today's network based service providers encounter one major problem. Every change to the customer's needs turns into a change request or a work order for the service provider. Since the service provider has to get involved for every change and also has to spend manpower for every change, this process is expensive and time consuming. Also, for the end user, the turn around time for getting a service change implemented is long.

Some Customer Network Management Systems have been deployed by service providers, which merely give a "view only" model for the network, with billing and network performance/status information. These systems do not even remotely address the configuration change problem stated above.

As a result, there is a need in the art for the present invention.

SUMMARY

The above-mentioned shortcomings, disadvantages and problems are addressed by the present invention, which will be understood by reading and studying the following specification.

To enable ISPs to deliver services using service processing switches, systems and methods are provided that make provisioning network resources, including Virtual Private Networks (VPNs) very easy. The systems and methods described reduce the resources required to manage a VPN network by allowing a subscriber to manage and control the resources allocated to the subscriber. For example, it is possible for ISPs to provision VPNs for hundreds, or even thousands of subscribers, each with a variety of services. Once resources have been allocated, the subscriber can manage the resources without the need for the service provider to get involved in every case.

In one embodiment, a computerized system for providing subscriber control of network parameters includes a service processing switch having a plurality of network resources; a service provider management server communicably coupled to the service processing switch and operable to configure the plurality of network resources. The configuration includes an allocation of a subset of the network resources to a subscribing enterprise. A subscriber management server is communicably coupled to the service provider management system and is operable to further configure the subset of the network resources. The system also includes a subscriber management client communicably coupled to the subscriber management server. The client is operable to issue configuration requests to the subscriber management server.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense.

In the Figures, the same reference number is used throughout to refer to an identical component which appears in multiple Figures. Signals and connections may be referred to by the same reference number or label, and the actual meaning will be clear from its use in the context of the description.

The detailed description is divided into multiple sections. In the first section the hardware and operating environment of different embodiments of the invention is described. In the second section, the software environment of varying embodiments of the invention is described. In the final section, a conclusion is provided.

Hardware and Operating Environment

Figure 1:
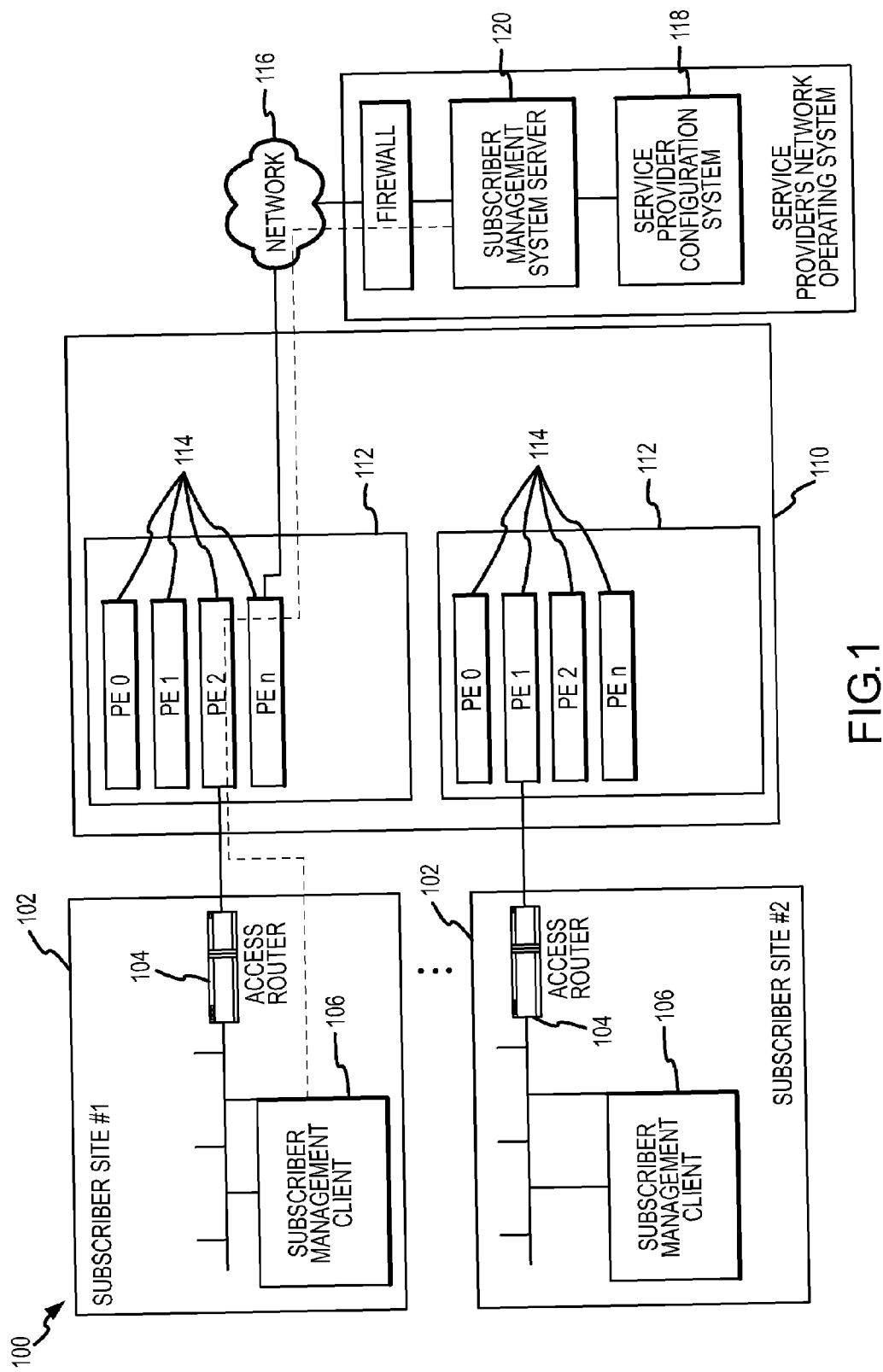
FIG. 1 is a block diagram of the hardware and operating environment in which different embodiments of the invention can be practiced.

FIG. 1 is a diagram of the hardware and operating environment in conjunction with which embodiments of the invention may be practiced. The description of FIG. 1 is intended to provide a brief, general description of suitable computer routing hardware and a suitable computing environment in conjunction with which the invention may be implemented. Although not required, the invention is described in the general context of computer-executable instructions, such as program modules, being executed by a computer, such as a personal computer or a server computer. Generally, program modules include routines, programs, objects, components, data structures, etc., that perform particular tasks or implement particular abstract data types.

As shown in FIG. 1, the system 100 includes a service processing switch 110, access routers 104, service management system 118, and subscriber management system client 106. In some embodiments, service processing switch 110 provides switching, routing and computing resources that can be allocated by a service provider to customers. In one embodiment, the service processing switch 110 is the IPSX 9000 service processing switch from CoSine Communications, Inc. However, the invention is not limited to any particular switch, router or service processing hardware.

Service processing switch 110 can contain one or more blades 112. In some embodiments of the invention, blades 112 have a type associated with them. Examples of blade types include, processing function, such as network blades, control blades, trunk blades, and processor blades. Network blades provide interfaces to different types of networks. Control blades provide system management and accounting functions to the service process system 110. Trunk blades provide access to high speed trunk networks. Processor blades provide general purpose computer processors that in some embodiments of the invention provide firewall, intrusion detection, or directory services. Blades are communicably coupled to one another. In one embodiment, a packet ring is used to communicably couple the blades 112.

In some embodiments, each of blades 112 includes one more processing elements 114. Processing elements 114 include CPU and memory that provide computing resources for the blade. The invention is not limited to any particular number of processing elements on a blade, nor is the invention limited to any particular number of blades in a service processing switch 110.

Service processing system 110 is typically communicably coupled to a network 116, for example the Internet. Network 116 can also be a Wide Area Network (WAN), a Local Area Network (LAN), or a private network.

Service processing system 110 is also typically communicably coupled to a plurality of customer networks 102 via customer access routers 104.

Service management system 118 hosts software that is used to configure and control the operation of service processing switch 110. In one embodiment of the invention, the service management system is a SPARC system available from Sun Microsystems, Inc. running the InVision product from CoSine Communications, Inc. Service management system 118 can be used to allocate resources within service processing switch 110 to various customers. In one embodiment of the invention, service management system 118 communicates with service processing switch 110 using the Simple Network Management Protocol (SNMP). Further details on the operation of service management system 118 are provided in U.S. patent application Ser. No. 09/663,485, entitled "SYSTEM AND METHOD FOR MANAGING AND PROVISIONING VIRTUAL ROUTERS", previously incorporated by reference.

Subscriber management system client 106 hosts software that configures and controls the resources within service processing switch 110 that have been allocated to the particular customer. The operation of software running on subscriber management system client 106 will be described in further detail in the sections that follow.

Subscriber management system server 120 hosts software that responds to requests from subscriber management system client 106. A logical connection between client 106 and server 120 is indicated by the dashed line. The operation of subscriber management systems server 120 will be described in further detail below.

Those skilled in the art will appreciate that the invention may be practiced with other routing system hardware configurations besides those described above.

Software Environment

The embodiments of the invention include a software environment of systems and methods that provide a mechanism for subscribers to manage the services provided to them by a third party network service provider such as an Internet Service Provider (ISP). This includes managing subscriber related aspects of VPN (Virtual Private Networks) and VRs (Virtual Routers) and other resources allocated to the subscriber within a service processing switch. Generally speaking, the embodiments of the invention include policy-based mechanism for network service management. Thus a service provider, such as an ISP managing a service processing switch can create and generate tunnels, routing, and other service configurations for VPNs (Virtual Private Networks). These VPNs use resources within switch 110 such as blades and processing elements that are allocated by a service provider to one or more subscribers, who then can configure those elements allocated to them. Configuration from the subscriber's perspective can be driven based on profiles. One subscriber cannot view, modify, or create configurations involving the resources allocated to a different subscriber.

Figure 2:
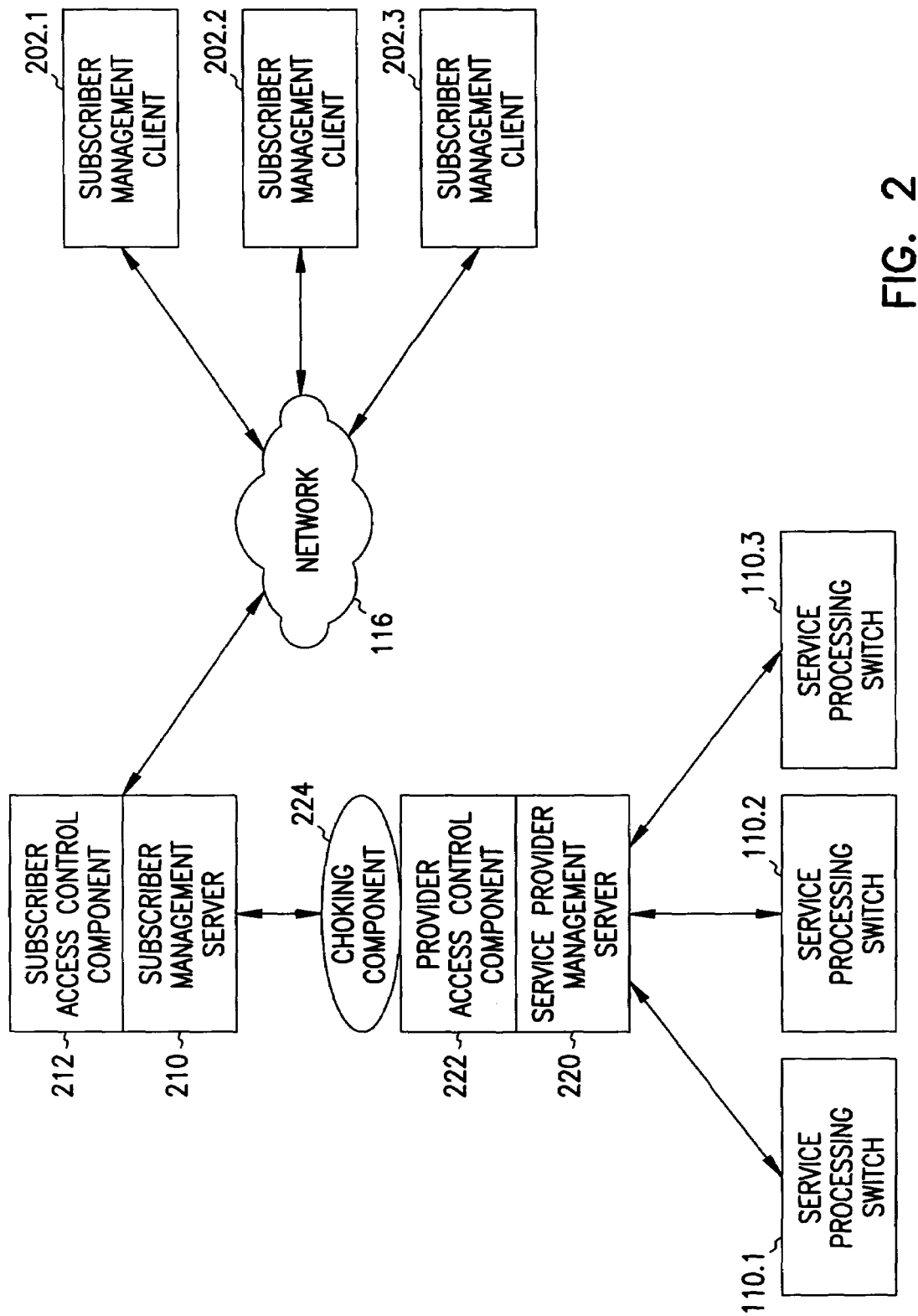
FIG. 2 is a diagram illustrating an exemplary software environment according to embodiments of the invention.

FIG. 2 provides an illustration of a subscriber configuration management system as used in various embodiments of the invention to provide subscriber management of network services provided by a third party. As illustrated, the system includes a subscriber management server 210, a service provider management system 220, and a subscriber management client 202.

Subscriber management client 202 comprises software that a subscriber uses to create, view, and modify the configuration network resources (typically virtual network resources) that have been allocated to the subscriber by a service provider. In one embodiment, the client 202 is browser based and works with web browsers such as Internet Explorer and Netscape. However, the invention is not limited to web browsers, and client component 202 can be applications software that provides a user interface for creating viewing, and modifying configuration parameters for resources within a virtual network.

Subscriber management server 210 receives requests from subscriber management client 202. In one embodiment, subscriber management server 210 is provided as part of the InGage software system available from CoSine Communications, Inc. In one embodiment of the invention, the server 210 includes web server software and communicates with client 202 using a secure Internet protocol, such as the HTTPS (HyperText Transfer Secure) protocol. Using a secure Internet protocol is desirable, because it allows users around the world to securely view and manage network service configurations. The subscriber management server 210 hosts and runs programs, which expose specific functionality to the enterprise customers (i.e., subscribers) that the server providers want to provide to the enterprise customers. In one embodiment of the invention, the subscriber management server 210 includes software programs that provide the following functions:
  Ability to add and remove enterprise users of the enterprise's VPN(s).
  Exposing limited firewall settings to the enterprise customer so that they can modify specific components of the firewall settings directly.
  Monitor the state of the subscriber's enterprise VPN(s).
  Provide Reports
  Maintain Audit Trail information, including:
    Login attempts
    Reports/Pages accessed
    Logs of all user addition/deletion and user privilege modifications
    Logs of all enterprise policy changes
  Maintain Usage Accounting, including:
    Number of users
    Resources usage per enterprise
    Resources usage per user
    Concurrent sessions It should be noted that the above described functions can be included in differing combinations in the various embodiments of the invention, and the invention is not limited to any particular combination of the above described functions.

Subscriber management server 210 includes a subscriber access control component 212. Subscriber access control component 212 operates to provide a layer of security in addition to that provided through the HTTPS protocol. In some embodiments of the invention, various privilege levels are provided to users. In one embodiment, three levels of user privileges are provided:
  1. ISP Administrator
  2. Enterprise Administrator
  3. Enterprise User ISP Administrator is a privilege that can be granted to the administrators of the subscriber management system, who act as "super-users" of the system. When subscriber management functionality is to be provided to an enterprise, an ISP Administrator can login to the subscriber management system and create the users for the enterprise. Typically, the ISP Administrator can just create one user for the enterprise with the role "Enterprise Administrator". The ISP Administrator also has privileges to use any enterprise VPN and create/delete/modify any user for any enterprise VPN.

An Enterprise Administrator is a role that has a defined scope within a given enterprise. i.e., every enterprise customer can have one or more Enterprise Administrators. An enterprise administrator is a role that acts as a super-user for all the subscriber management related functionality for a particular enterprise's VPN or set of VPNs. An Enterprise Administrator can create other enterprise users within the subscribing enterprise's VPN. The role also allows for creating/modifying/deleting other Enterprise Users for the VPN, and use of any functionality exposed for the VPN through the subscriber management system. In addition, an Enterprise Administrator can modify any configuration or policy entries for the enterprise. Further, Enterprise Administrators can view/edit/add/delete packet filter and firewall policies and view/edit/add/delete NAT (Network Address Translation) policies for one or more sites belonging to their enterprise An Enterprise User is a role that can be created within the scope of a subscribing enterprise's VPN. Also, various access levels can be given for an enterprise user. In some embodiments, Enterprise User's are limited to monitoring functions, that is, they can view VPN statistics and configurations, but cannot modify them. For example, an Enterprise User can view packet filter and firewall policies for one or more sites belonging to their enterprise. In addition, Enterprise Users can view NAT (Network Address Translation) policies for one or more sites belonging to their enterprise. In other alternative embodiments, subscriber management functionality such as Firewall Monitoring, Network Monitoring, Firewall Configuration etc. can be permitted or denied for each individual enterprise user. Similarly, if an enterprise VPN is connecting various enterprise sites, an enterprise user can be configured to have privileges only for those sites that the user has permissions to.

As noted above, the subscriber management system 210 includes the ability to monitor the configuration and status of network resources allocated to a subscriber. Included in the monitoring function is the ability to perform the following:
  Provide a list of all the ports allocated to a particular enterprise customer with their status. In one embodiment, the list includes:
    Site Name—the location of the enterprise customer's site connected to this port
    Port Type—type of port such as Ethernet, DS3, OC-3 etc. It should also display encapsulation details such as the link is running PPP, HDLC or Frame Relay.
    Port Status—the status of the port/interface i.e., up/down
    Features—should list all the features available for this site, such as firewall, NAT, etc. It should also indicate the status of these features, i.e., enabled or disabled.
  Provide a list of all the tunnels created for the particular enterprise customer with their status. In one embodiment, each entry includes:
    Tunnel Endpoint1 Site Name—the location of the enterprise customer's site connected to one end of the tunnel
    Tunnel Endpoint2 Site Name—the location of the enterprise customer's site connected to the other end of the tunnel
    Features or Type of Tunnel—should indicate Manual IPSec, IKE etc
    Status—the status of the tunnel i.e., up/down
  Provide a graphical topology of the customer's VPN. In one embodiment, the graphical topology shows the customer sites and the connecting tunnels As noted above, some embodiments of the invention provide reporting capability. Included in the reports generated by the subscriber management system are performance reports for ports allocated to the subscriber. In one embodiment of the invention, these reports include:

Total Packets (packets/sec)
Total Bytes (bytes/sec)
Total Discards In & Out (packets/sec)
Total Errors (errors/sec)
Availability In addition, performance reports related to tunnels created for the enterprise can be generated. In one embodiment, these reports include the following:

Total Packets (packets/sec)
Total Bytes (bytes/sec)
Total Discards In & Out (packets/sec)
Total Errors (errors/sec)
Latency Service provider management server 220 is communicably coupled to subscriber management server 210, and operates to service requests received from subscriber management server 210 to perform the functions described above. In one embodiment, service provider management system is the InVision system available from CoSine Communications, Inc. Service provider management system 220 controls the network and network elements in the service provider's network. In some embodiments, subscriber management system 210 never directly communicates with the network elements. Instead, it uses the interfaces exposed by the service provider management system 220. Service provider management system 220, in turn, performs the operations on subscriber management server's behalf on the network.

In some embodiments of the invention, service provider management server 220 includes provider access control component 222 and choking component 224. Provider access control component 222 provides security using an access control mechanism. The access control mechanism provides user-level access control. In one embodiment of the invention, a special user is created to represent subscribers. In one embodiment, the user is called "InGage." This user is only exposed to the functionality required by subscriber management systems 210. In some embodiments, during its startup procedures, subscriber management server 210, creates a user session with the service provider management system 220 by logging in as "InGage" and providing the appropriate password. This level of security ensures that only the kind of functions exposed to the subscriber management system 210 can be used by a hacker who can hack into the service provider management system 220 directly.

Chocking component 224 provides a mechanism to ensure that not more than a configurable number of active subscriber management requests can be submitted to the service provider management system 220 concurrently. If the total number of requests submitted by subscriber management server 210 ever exceeds the maximum allowed, the requests are queued so that a flood of subscriber management requests cannot bring the service provider management system 220 or the network down.

Figure 3:
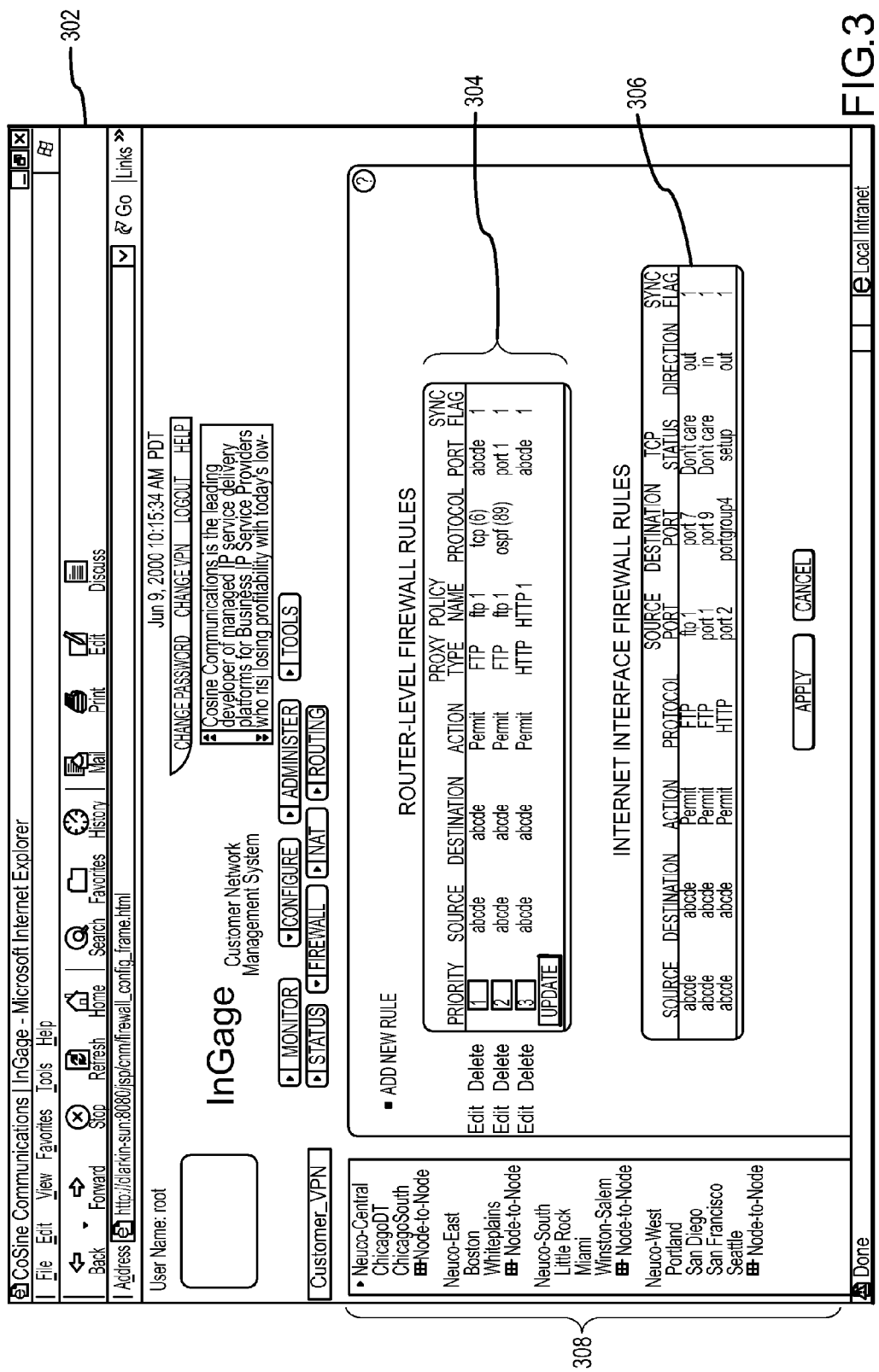
FIG. 3 is a diagram illustrating an exemplary user interface screen according to an embodiment of the invention.

An exemplary user interface screen 302 is illustrated in FIG. 3. As shown screen 302 includes a VPN list 308, router-level firewall rules configuration 304, and Internet interface firewall rules 306. VPN list 308 provides a list of VPNs and nodes within the VPN that are currently configured for the subscribing enterprise. As a user selects a VPN or a VPN node from the list, the rules associated with the VPN or node are displayed. In one embodiment, the router level rules 304 include a rule priority, a source and destination address associated with the rules, an action (i.e. permit, deny etc.), the proxy type, the policy name for the policy to be applied, the protocol, the port, and sync flag.

Internet interface firewall rules 306 in one embodiment include source and destination addresses, action to be taken (i.e. permit, deny), the protocol, the source and destination ports, the TCP status of the connection, the direction of packets (i.e. inbound or outbound) and the sync flag.

This section has described a system level overview of the software according to various embodiments of the invention that provide for subscriber configuration of virtual network resources allocated by a service provider. It should be noted that while a multiple tier system has been presented, other configurations are possible and within the scope of the invention. For example, the functionality of the subscriber management server 210 and the service provider management server 220 could reside on the same hardware. In addition, multiple instances of subscriber server 210 can exist in order to provide scalability to the system, thereby allowing a service provider to scale up the number of users who can access the system by adding more server machines to the network, which can seamlessly share the load to ensure that all the subscribing users are serviced uniformly.

Methods for Performing Profile-Based Routing Configuration

Figure 4:
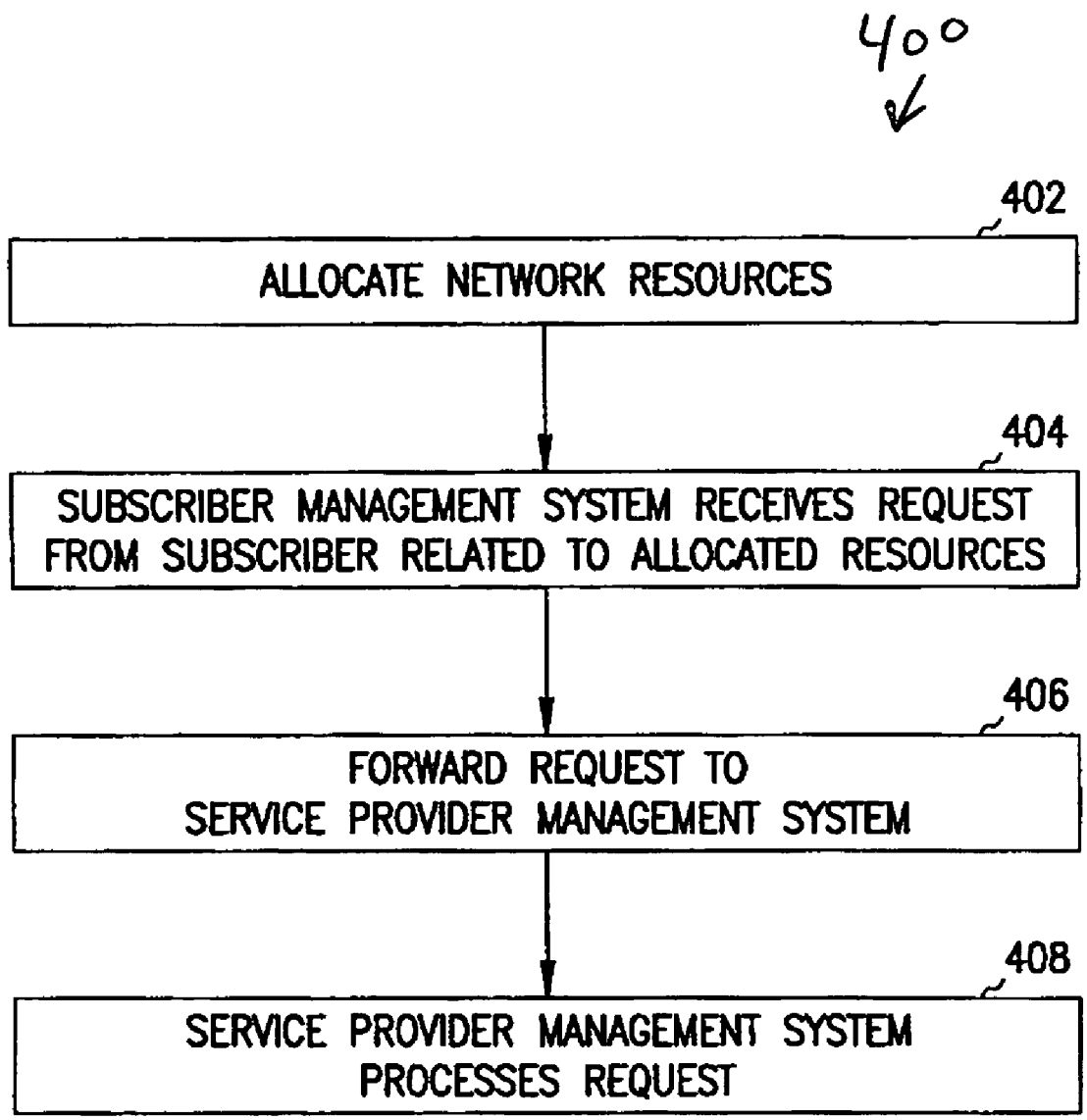
FIG. 4 is a flowchart illustrating a method for configuring according to an embodiment of the invention.

In the previous section, a system level overviews of the operation of exemplary embodiments of the invention were described. In this section, the particular methods of the invention performed by an operating environment executing an exemplary embodiment are described by reference to a flowchart shown in FIG. 4. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The method illustrated in FIG. 4 is inclusive of the acts required to be taken by an operating environment executing an exemplary embodiment of the invention.

A method for configuring network resources 400 begins when network resources are allocated to a subscribing enterprise. The network resources include processing elements, virtual routers, virtual private networks, network interfaces, virtual interfaces and network ports (block 402).

After resources have been allocated, a subscriber management system receives a request related to the allocated resources (block 404). Typically the request will come from a browser application. The request can be to view a configuration of network resources, or the request can be to modify the configuration.

Next, the request is forwarded to a service provider management system (block 406). The service provider management system performs validation checks to ensure that the request is for resources allocated to the subscriber. If the request is valid, the service provider management system executes the request (block 408). In some embodiments, the service provider management system uses SNMP (Simple Network Management Protocols) to cause a service providing switch to be updated with the configuration request.

CONCLUSION

Systems and methods for providing a subscriber the ability to configure and maintain virtual router resources allocated by an service provider are disclosed. The embodiments of the invention provide advantages over previous systems. For example, the embodiments of the invention provide a mechanism for a subscriber to configure services provided by a network service provider with zero software maintenance from the subscriber's point of view. The subscriber does not have to install, update or maintain any software element in the enterprise site for easily and rapidly generating configuration information for large numbers of virtual routers and virtual private networks based on profiles. In addition, the subscriber maintains a level of control over the network resources they have been allocated, thereby reducing or eliminating the mistrust many subscribers have due to the outsourcing of network service to service providers. Furthermore, subscribers obtain views of their service, and updates on network performance that can be compared with service level commitments. In addition, subscribers can adjust various network parameters without having to rely on or wait for the network service provider to perform the change. Conversely, the network service provider is not overwhelmed with the many change requests that each subscriber invariably makes.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A computerized system for providing subscriber control of network parameters comprising:
   a service processing switch having a plurality of network resources allocatable to one or more virtual routers of a plurality of virtual routers executing within the service processing switch, wherein differing subsets of the plurality of virtual routers are allocatable to each of a plurality of subscribing enterprises;
   a service provider management server communicably coupled to the service processing switch and operable to configure the plurality of network resources, said configuration including an allocation of a subset of the network resources to a first subscribing enterprise of the plurality of subscribing enterprises by allocating a first set of virtual routers of the plurality of virtual routers to which the subset of the network resources have been allocated to the first subscribing enterprise;
   a subscriber management server communicably coupled to the service provider management system and operable to further configure the subset of the network resources responsive to configuration requests received from the first subscribing enterprise; and
   a subscriber management client, associated with the first subscribing enterprise, communicably coupled to the subscriber management server, said subscriber management client operable to cause the subscriber management server to further configure the subset of the network resources as desired by the first subscribing enterprise by issuing the configuration requests to the subscriber management server.

2. The system of claim 1, wherein the plurality of network resources includes a packet filter.

3. The system of claim 1, wherein the plurality of network resources includes a firewall.

4. The system of claim 1, wherein the plurality of network resources includes a network address translation module.

5. The system of claim 1, wherein the plurality of network resources includes a virtual private network (VPN).

6. The system of claim 1, wherein the plurality of network resources includes one or more processing elements.

7. The system of claim 1, wherein the service provider management server includes a choking component logically interposed between the subscriber management server and the service provider management server, the choking component configured to protect the service provider management server from a flood of subscriber management requests by queuing configuration requests when a pending number of configuration requests exceeds a predetermined threshold.

8. The system of claim 1, wherein the first subscribing enterprise is provided with an ability to easily and rapidly generate configuration information for large numbers of the subset of the network resources based on profiles.

9. The system of claim 1, wherein the first subscribing enterprise may issue to the subscriber management server requests relating to one or more of:
   monitoring a current configuration of the subset of the network resources allocated to the first subscribing enterprise;
   monitoring a current status of the subset of the network resources allocated to the first subscribing enterprise;
   generating reporting information for ports of the service processing switch allocated to the first subscribing enterprise; and
   generating reporting information for tunnels allocated to the first subscribing enterprise.

10. A computerized method for configuring network resources, the method comprising:
   allocating, by a service provider, a subset of network processing resources of a service processing switch operated by the service provider to one or more virtual routers of a plurality of virtual routers executing on the service processing switch;
   allocating at least one of the one or more virtual routers to a subscribing enterprise of a plurality of subscribing enterprises associated with the service provider;
   receiving, by a subscriber management system associated with the service provider, a configuration request related to the subset of network processing resources allocated to the at least one virtual router from the subscribing enterprise;
   forwarding the configuration request to a service provider management server associated with the service provider; and
   configuring the subset of network processing resources in accordance with the configuration request by processing the configuration request by the service provider management server.

11. The method of claim 10, wherein the plurality of network resources includes a packet filter.

12. The method of claim 10, wherein the plurality of network resources includes a firewall.

13. The method of claim 10, wherein the plurality of network resources includes a network address translation module.

14. The method of claim 10, wherein the plurality of network resources includes one or more processing elements.

15. The method of claim 10, further comprising a choking component of the subscriber management system logically interposed between the subscriber management system and the service provider management server, protecting the service provider management system from a flood of subscriber management requests by queuing configuration requests received from the subscribing enterprise when a pending number of configuration requests exceeds a predetermined threshold.

16. The method of claim 10, further comprising the subscribing enterprise generating configuration information for large numbers of the subset of network processing resources based on profile-driven approach.

17. The method of claim 10, further comprising the subscriber management system responding to requests from the subscribing entity for information regarding one or more of:
- a current configuration of the subset of the network processing resources allocated to the subscribing enterprise;
- a current status of the subset of the network processing resources allocated to the subscribing enterprise;
- statistics regarding ports of the service processing switch allocated to the subscribing enterprise; and
- statistics regarding tunnels allocated to the subscribing enterprise.

* * * * *